US012629812B2

(12) United States Patent
Langlotz

(10) Patent No.: US 12,629,812 B2
(45) Date of Patent: May 19, 2026

(54) TOOL SET WITH INTERSPERSED DUAL STANDARD ELEMENTS

(71) Applicant: Bennet Karl Langlotz, Dallas, TX (US)

(72) Inventor: Bennet Karl Langlotz, Dallas, TX (US)

(73) Assignee: BULLETPROOF PROPERTY MANAGEMENT, LLC, Cheyenne, WY (US)

( * ) Notice: Subject to any disclaimer, the term of this patent is extended or adjusted under 35 U.S.C. 154(b) by 1188 days.

(21) Appl. No.: 17/071,175

(22) Filed: Oct. 15, 2020

(65) Prior Publication Data

US 2021/0046635 A1 Feb. 18, 2021

Related U.S. Application Data

(63) Continuation-in-part of application No. 16/043,294, filed on Jul. 24, 2018, now abandoned.

(60) Provisional application No. 62/915,694, filed on Oct. 16, 2019.

(51) Int. Cl.

| | |
|---|---|
| ***B25H 3/00*** | (2006.01) |
| *B25B 15/00* | (2006.01) |
| *B25G 1/08* | (2006.01) |

(52) U.S. Cl.

CPC ............ *B25H 3/003* (2013.01); *B25B 15/008* (2013.01); *B25G 1/085* (2013.01)

(58) Field of Classification Search

CPC .................... B25B 15/008; G09F 3/02; G09F 2003/0208; G09F 2003/0276; G09F 23/00; B25F 1/04; B25H 3/04

See application file for complete search history.

(56) References Cited

U.S. PATENT DOCUMENTS

| | | | | |
|---|---|---|---|---|
| 5,964,348 A | 10/1999 | Matsuda | | |
| 8,893,886 B2 * | 11/2014 | Tsukaguchi | B25H 3/003 | 211/70.6 |
| 2005/0077198 A1 * | 4/2005 | Wikle | B25H 3/025 | 206/373 |

FOREIGN PATENT DOCUMENTS

| | | | |
|---|---|---|---|
| DE | 202004009153 * | 9/2004 | B25H 3/003 |
| DE | 202004009153 U1 * | 10/2004 | B25H 3/003 |

OTHER PUBLICATIONS

Eli Banayan, Sort-A-Tool Will Get You Sorted Out!, https://www.speedville.com/sort-tool-will-get-sorted/, Nov. 26, 2013, Speedville.com, Accessed Jan. 7, 2021.

(Continued)

*Primary Examiner* — Andrew D Perreault

(74) *Attorney, Agent, or Firm* — Bennet K. Langlotz; Langlotz Patent & Trademark Works, LLC

(57) ABSTRACT

A tool kit has a first set of tools of a first standard and of different sizes, a second set of tools of a different second standard and of different sizes, and a holder adapted to receive the first and second set of tools intermixed with each other in an integrated sequence arranged according to size irrespective of standard. The different standards may be indicated by different colors or other indicia, or by positions, such as offset rows that preserve the sequence.

21 Claims, 9 Drawing Sheets

(56) References Cited

OTHER PUBLICATIONS haridesign.com, "Sortatool," http://www.haridesign.com/Sortaweb/main.html, Publication Date Unknown, Haridesign.com, Accessed Jan. 7, 2021.
Amazon.com, "Tool Sorter Wrench Organizer—Red," https://www.amazon.com/Tool-Sorter-Wrench-Organizer-Red/dp/B00HNZWPCQ, Amazon.com, Date First Available: Aug. 7, 2015, Accessed Jan. 7, 2021.
Excerpt from Eklind Product Catalog Feb. 1, 2019.

* cited by examiner

TOOL SET WITH INTERSPERSED DUAL STANDARD ELEMENTS

CROSS-REFERENCE TO RELATED APPLICATION

This application a Continuation-in-Part of U.S. patent application Ser. No. 16/043,294 filed on Jul. 24, 2018, entitled "TOOL SET WITH INTERSPERSED DUAL STANDARD ELEMENTS," and also claims the benefit of U.S. Provisional Patent Application No. 62/915,694 filed on Oct. 16, 2019, entitled "TOOL SET WITH INTERSPERSED DUAL STANDARD ELEMENTS," which are hereby incorporated by reference in their entirety for all that is taught and disclosed therein.

FIELD OF THE INVENTION

This relates to tools, and more particularly to sets of tools having a range of different sizes.

BACKGROUND OF THE INVENTION

Tools such as Allen wrenches are typically arranged in sets having a sequence of different standard sizes. These sets are typically in a single format or standard, such as matric or fractional inch. Users will generally require two sets, and these sets segregate the tools of one format from tools of the other format.

Many fasteners do not provide an indication of what size, format or standard they are. A user with an unknown fastener may make a visual estimation of the size of the fastener, and that test a tool. If that is not a fit, the user selects a larger or smaller tool as needed.

While effective, this presents problems when there are two formats of fastener configurations that are not visually evident. In some instances, when the user is attempting to use the wrong tool set format, such as fraction tools for a metric fastener, the use will find after testing multiple tools that none is a fit—all are too large or too small. This indicates that the wrong set is being used, and the user repeats the size selection process with the other format set. This is an annoyance and inconvenience.

A greater risk is that for some tool and fastener sizes, there will be workable but incorrect tool fits. The wrong format tool will be close enough to that of the right format tool that a user may be deceived into thinking it is a correct fit, and never realize that other format set should be used. With the slightly incorrect fit, the tool or fastener may be damaged by the use.

Accordingly, there is need for a tool kit with a first set of tools of a first standard and of different sizes, a second set of tools of a different second standard and of different sizes, and a holder adapted to receive the first and second set of tools intermixed with each other in an integrated sequence arranged according to size irrespective of standard. The different standards may be indicated by different colors or other indicia, or by positions, such as offset rows that preserve the sequence.

DETAILED DESCRIPTION

Figure 1:
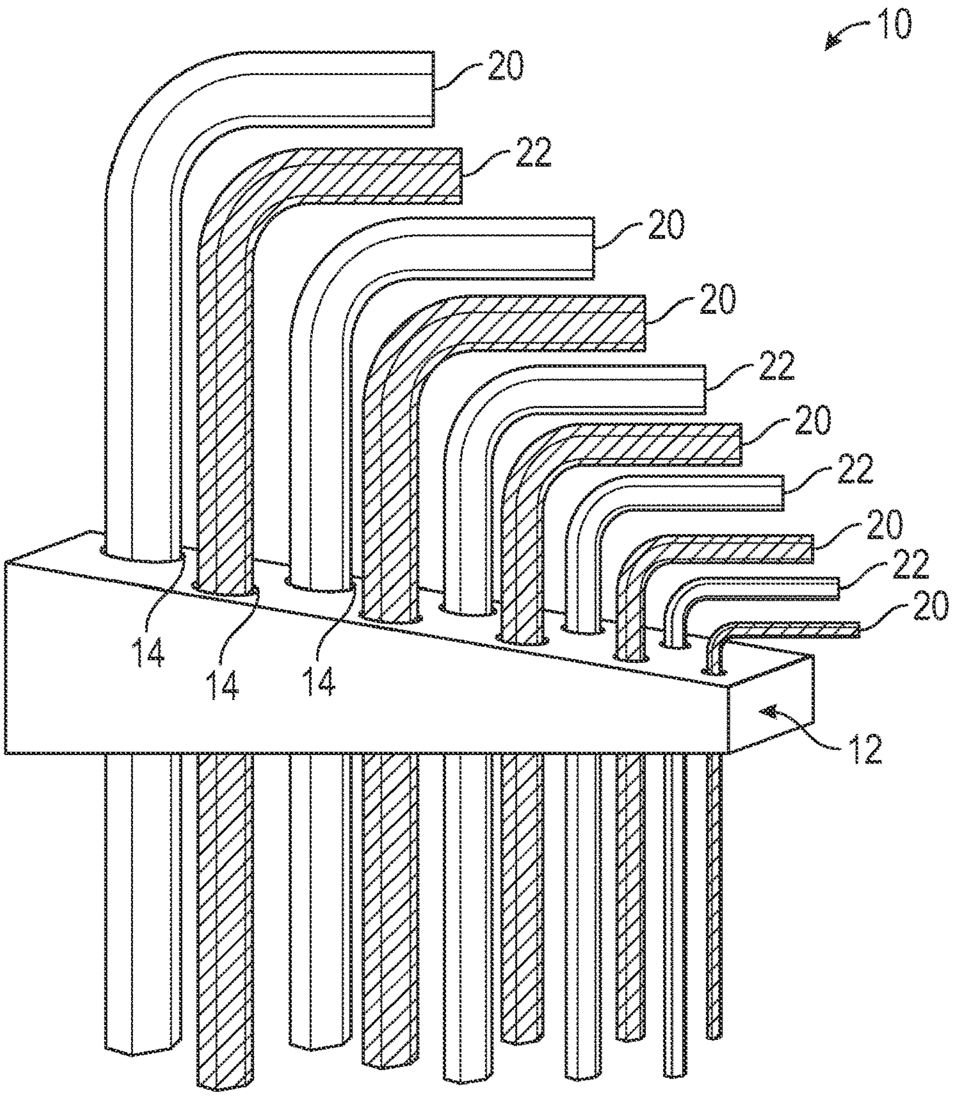
FIG. 1 shows a tool kit according to a first embodiment of the invention.

FIG. 1 shows an Allen Wrench set 10 including a holder block 12 defining a sequence of passages 14 or graduated sizes in a row arranged by size. The apertures are each sized to removably retain an Allen wrench of a selected size.

A first set of wrenches 20 is a set of a range of different sizes of a first dimensional format or standard, such as Metric, with the wrenches having sizes designated in millimeters.

A second set of wrenches 22 is a set of a range of different sizes of a second dimensional format or standard, such as fractional inch, with the wrenches having sizes designated in fractional inches.

The first set 20 is shown in black and the second set 22 is shown in white as indicia to identity the standard or format associated with each wrench. This indicia may be any visible marking, coloring, or plating, or any attachment such as a handle with a shape color, texture or other indicia to indicate the associated standard or format. The block may also have indicia of the dimensional specification of each tool associated with each aperture to assist in replacing loose wrenches in position.

The wrenches are arranged in sequence by their actual size. For illustration, a limited number of wrenches are shown. Allen wrench sets of metric and fractional standards may typically have the following sizes, arranged in interspersed, integrated, and numerical sequence by actual size regardless of standard:

| metric (mm) | fractional (in) | decimal (in) | % larger |
|---|---|---|---|
| | 0.05 | 0.0500 | |
| 1.5 | | 0.0591 | 18.1% |
| | 1/16 | 0.0625 | 5.8% |
| | 5/64 | 0.0781 | 25.0% |
| 2 | | 0.0787 | 0.8% |
| | 3/32 | 0.0938 | 19.1% |
| 2.5 | | 0.0984 | 5.0% |
| | 7/64 | 0.1094 | 11.1% |
| 3 | | 0.1181 | 8.0% |
| | 1/8 | 0.1250 | 5.8% |
| | 9/64 | 0.1406 | 12.5% |
| | 5/32 | 0.1563 | 11.1% |
| 4 | | 0.1575 | 0.8% |
| | 3/16 | 0.1875 | 19.1% |
| 5 | | 0.1969 | 5.0% |
| | 7/32 | 0.2188 | 11.1% |
| 6 | | 0.2362 | 8.0% |
| | 1/4 | 0.2500 | 5.8% |
| | 5/16 | 0.3125 | 25.0% |

-continued

| metric (mm) | fractional (in) | decimal (in) | % larger |
|---|---|---|---|
| 8 | | 0.3150 | 0.8% |
| | ⅜ | 0.3750 | 19.1% |
| 10 | | 0.3937 | 5.0% |

The first column represents the metric wrenches of set 20, and the second column represents the wrenches of set 22. These do not necessarily alternate, and there are occasions in which wrenches of the same standard are adjacent in sequence. There are other occasions where wrenches of different standards are very nearly the same, such as the 5⁄64$^{th}$ inch and 2 mm wrenches, and their 2× and 4× multiples 5⁄32, 5⁄16 and 4 mm and 8 mm. These essential equivalents differ from their matches by only 0.8%, which is believed to be within the tolerance of fastener hex socket dimensions. If there is a concern about a no-go misfit for fasteners with socket sizes at the lower limit of tolerances, the slightly smaller fractional inch nominal size may be used. In these instances, economy, compactness, and lighter weight may be achieved by omitting the duplicative ones, and the user seeing a suitable size will naturally select the suitable size even if not officially of the same standard as the fastener.

With the exclusion of duplicate tools, it may be useful to mark the tool or the holder at the tool's location with indicia for both compatible sizes (e.g. "5⁄64 2 mm") just as all other tools or locations may be marked with the actual single tool size. The effective duplicated size (e.g. 2 mm) may be indicated on labeling or packaging parenthetically to indicate the capability but to avoid creating consumer confusion about the number of tools present.

The user will normally select a wrench that appears to be the correct size for a fastener, and if too small test larger sizes until the largest one that still fits is found—for female tools like sockets and box wrenches the smallest that fits is selected. In any case the tightest fit is preferred. By sequencing the tools by size, the user need not wonder if they could achieve a tighter and more correct fit in a wrench set of the other standard, nor does the user who tests and finds the tightest of each standard need to qualitatively estimate which is actually the tighter fit. With the illustrated embodiment it is readily established which is the tightest fit by the one that still fits and is one size smaller than—adjacent in the sequence to—the smallest one that does not fit.

Figure 2:
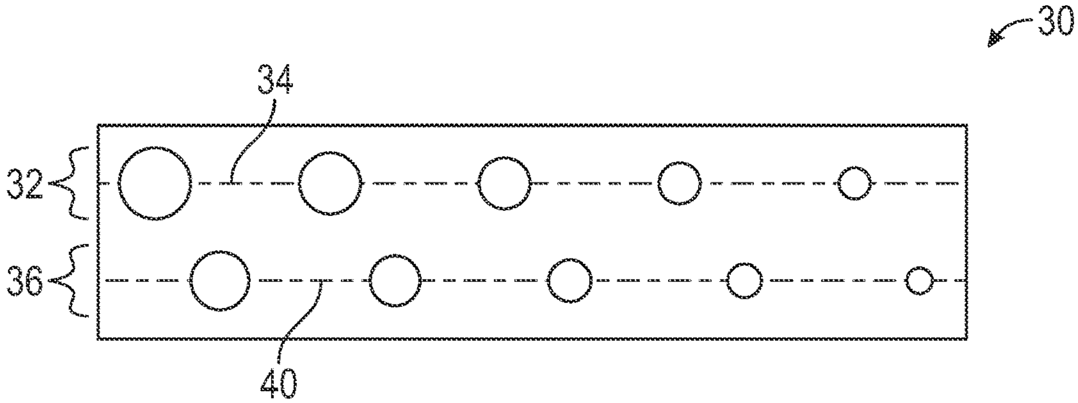
FIG. 2 shows a tool holder according to a second embodiment of the invention.

FIG. 2 shows an alternative storage block 30 in which the graduated-size apertures that receive the tools are arranged in size sequence along the length of the block, but in rows that are offset from each other. The spaces 32 for metric tools are in a first row 34, and the spaces 36 for fractional tools are in a second row 40 offset from the first. This is analogous to black keys and white keys on a piano keyboard that are arranged sequentially by pitch but with offset striking surfaces.

The offset rows are only one example of how the storage black may indicate the format or standard of the wrenches without disrupting the size sequence and integrated and interspersed quality. Alternatives include having each region associated with a standard in a color, texture or other quality that is distinguished from the other standard's region. This quality may be associated with the distinctive indicia of each set of wrenches, such as having a darker block region associated with the wrenches of a standard that is indicated by plating or coating of a darker color. This facilitates the returning of tools to their proper apertures, especially when tools of different standards may be very similar in size. An alternative or additional indicator of the different standard region is elevating one portion to a different level. In simpler embodiments, the tools may be arranged in a straight line, with printed indicia indicating the tool size to be received at a location.

Figure 3:
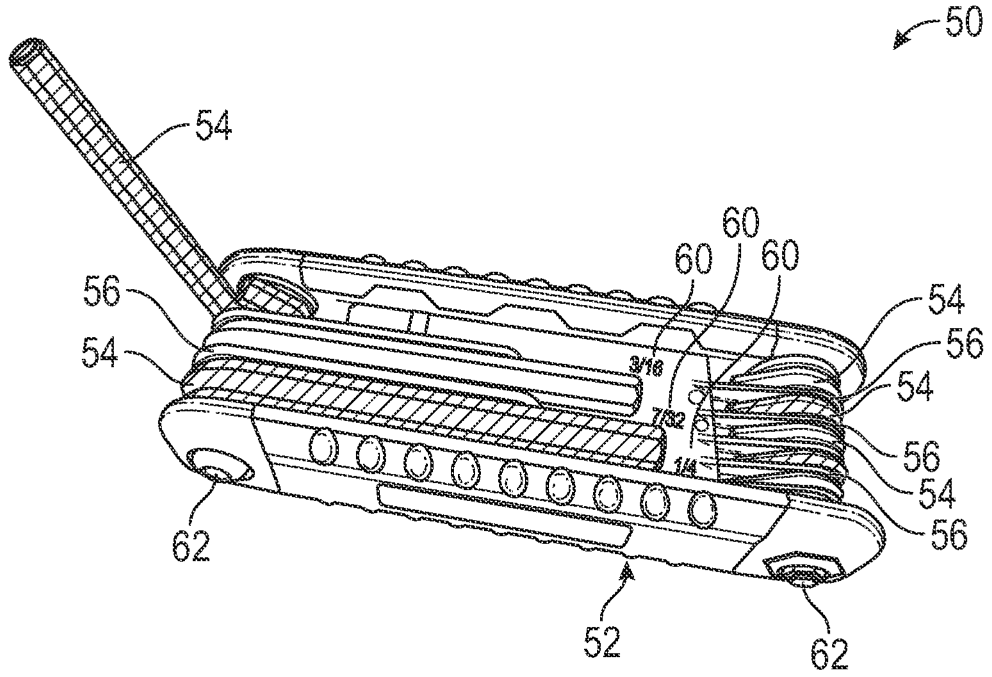
FIG. 3 shows a tool kit according to a third embodiment of the invention.

FIG. 3 shows a compact Allen wrench set 50 with wrenches attached to a handle 52 and having a folding capability. This is a conventional format and structure for single standard wrench sets but is assembled with the wrenches of two different standard formats 54, 56 integrated according to the principles of the invention. The wrenches or handle may be provided text markers 60 indicating size, and the wrenches are colored or provided with visual indicia to indicate their standard format.

The use of indicia for standard indication is useful not only for replacing tools in a proper location—not a concern in this embodiment in which tools are captured with loop ends receiving pivot pins 62 on the handle, but also for users who know what format their project or fastener requires and can avoid testing tools of the wrong format.

Figure 4:
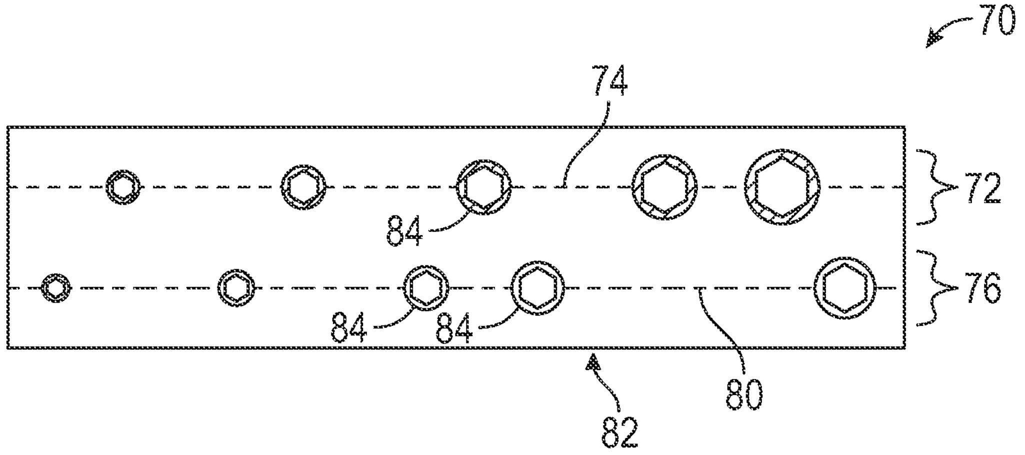
FIG. 4 shows a tool kit according to a third embodiment of the invention.

FIG. 4 shows a socket tool kit 70 having a first set 72 of metric sockets of a first color arranged on a first line 74, and a second set 76 of fractional sockets arranged in a second line 80 offset from the first line 76. As with other embodiments, the sockets are provided with indicia to indicate their standard format. The sockets are held in a housing or tray 82 defining apertures 84 in the illustrated arranged, and the apertures are sized to closely receive only the correct size socket. Tools of any type that come in sizes, such as box wrenches and drill bits may be fabricated and housed according to these principles.

Figure 5:
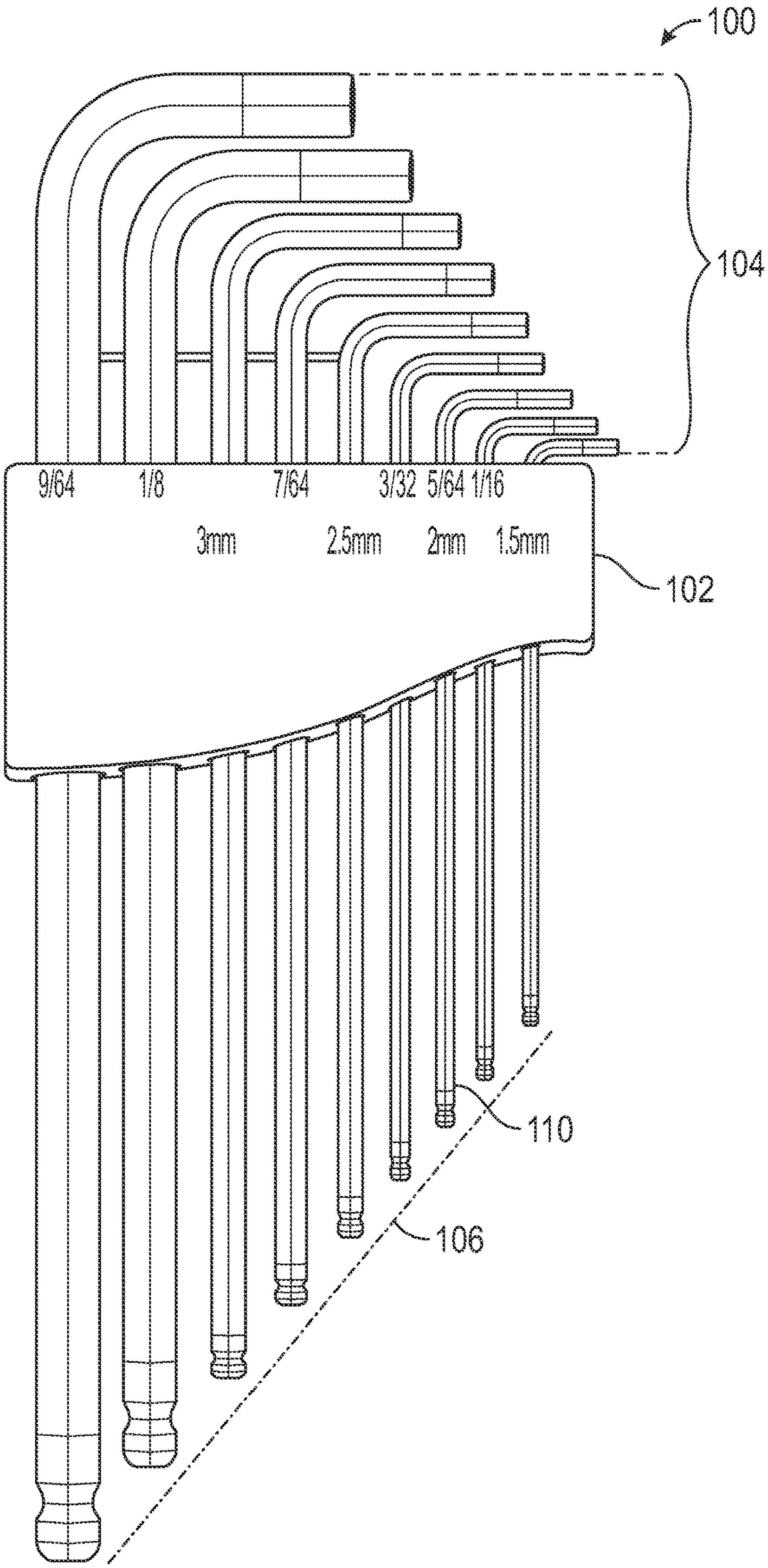
FIG. 5 shows a tool kit.

FIG. 5 shows a tool set 100 with a block 102 having a row of holes sized to receive the set of tools 104 of both formats, arranged by functional dimension. This illustrates the typical appearance of the graduated lengths of the tools, as is common in single format sets. While tool lengths need not be mathematically proportionate to the caliber or effective size, the graduated length provides a visual and intuitive confirmation that tools are in the right apertures, as the tool tips terminate in a line 106. In the illustrated example, the tool ends are in a straight line even as the upper ends are offset due to the L shapes nesting. This straight line may be curved, and preferably have a smooth or continuous shape without steps, and most preferably with no instances in which a smaller caliber tool has an actually longer or apparently longer length as seated in the holder. While tools are normally made with length proportional to girth, when combining existing sets of formats, often existing components used by manufacturer do not provide a smooth appearing pattern, because there has previously been no motivation to ensure that each metric tool appears to be a length between the lengths of the two inch tools that surround it in a sequence based on too width.

For tools that serve in each format (such as 5⁄64 and 2 mm being essentially the same size) special appearance features or indicia may be provided, such as coating or coloring only one portion of the tool as associated with one format and with another portion in the other visual condition associated with the other format. This may include having one of more faces of the six sides in one color while the others are ion the other color. It may also be achieved by having one end of the tool with one appearance and the other with the other appearance. If only a single indicia is used for a tool serving in both formats, that may preferably be selected to reflect the dominant or primary format in the jurisdiction in which the tool is expected to be used (e.g. inch for US, Metric for Europe). A selected tool 110 is shown with visual coating characteristics or indicia common to each different format's appearance, in this example it alternates lengths of the darker and lighter colorations associated with the respective formats.

Existing tool sets and holders for L-shaped wrenches often have two straight rows, as FIG. 5 is illustrated one straight row for clarity and simplicity, with another straight row potentially being occupied by a series of tools all larger than the largest in the illustrated row. Each row preferably has its own linear or smooth length slope or curve. The largest tool of the row of smaller tools will normally have a shorter actual length than the smallest of the row of larger tools. Note that when referring to size in this application, all references to size (caliber, girth, width, big, small) are specifically to the tools' width and not length. Length is specifically indicated where intended.

Where tools are arranged in straight rows, as elsewhere, the indicia showing the intended tool size is provided at each storage position. Even a holder without tools may be provided according to an embodiment of the invention with indicia indicating the dimensionally integrated tool set to be stored. A set such as of socket tools with an unmarked holder with an array of evenly spaced 3/8" square posts for holding sockets is considered to have the indicia even by the presence of how the sockets are initially installed.

Figure 6:
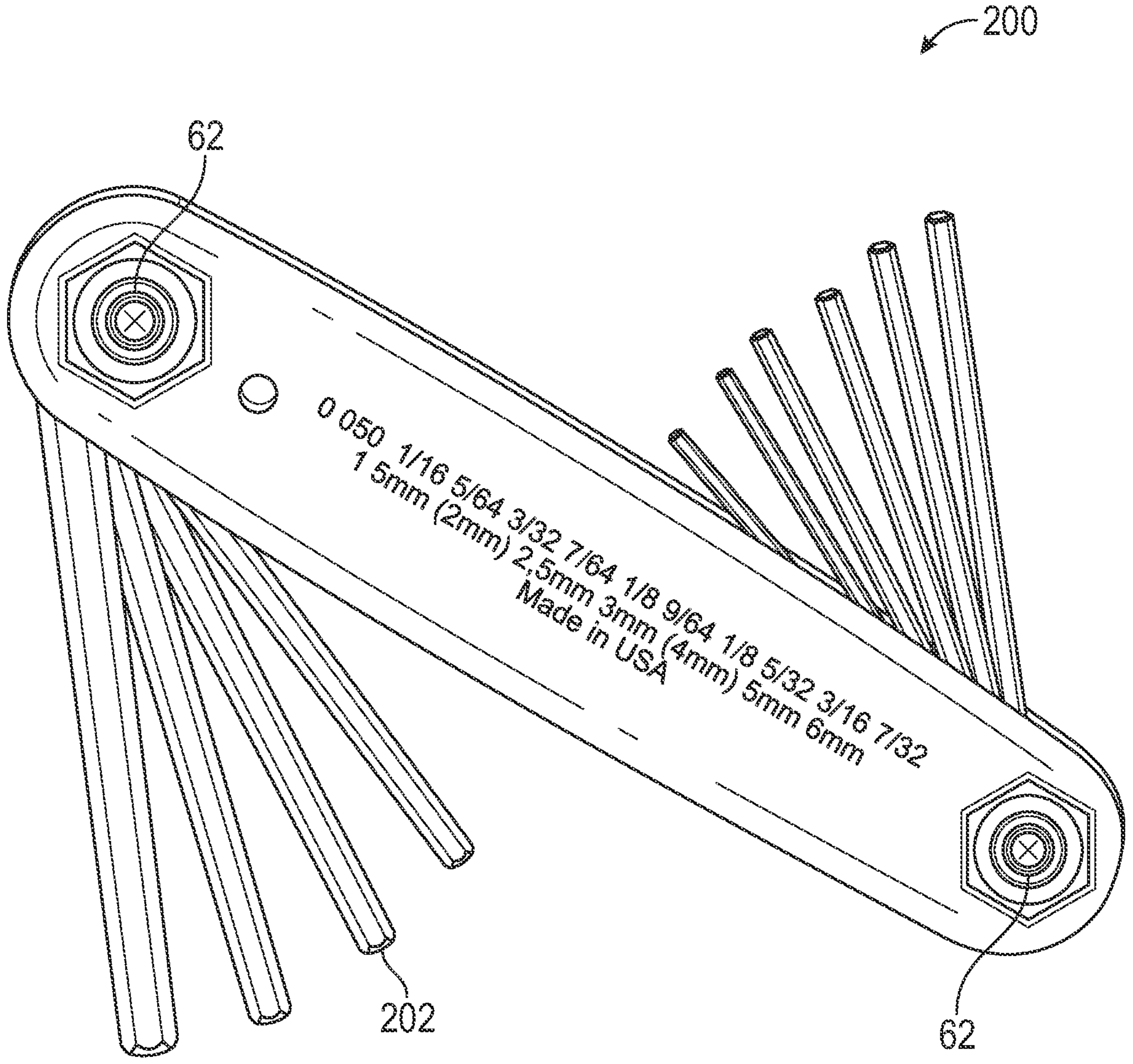
FIG. 6 shows a tool kit.

Like the FIG. 3 folding tool, a folding tool 200 is shown in FIG. 6, and also has the same proportional length tool elements, with the lengths of each element from the pivot 62 being based on its functional size. In some embodiments like this in which there is no need to identify smaller and larger tools for reinstallation in a separate block, the tools may be of the same apparent length, or nearly the same. In this embodiment, a slight gradation of length suits tool manufacturing, and the format of the Z-block housing. A selected tool 202 serving duplicate metric and inch functions is shown in another format to call attention to its function, with an end portion of the tool having the surface appearance of one format, and the rest having the appearance of the other. The FIG. 6 illustration is shown with alternating tool formats for illustrative purposes, but in most actual applications there may be adjacent pairs of one type or the other based on actual dimensions. The holder is an elongated body having first and second pivot axes at opposed respective first and second ends, and a first plurality of tools pivotally connected at the first end to pivot about the first axis ranging in size from a smallest size to a first intermediate size, and a second plurality of tools pivotally connected at the second end to pivot about the second axis ranging in size from a second intermediate size greater than the first intermediate size to a largest size.

Figure 7:
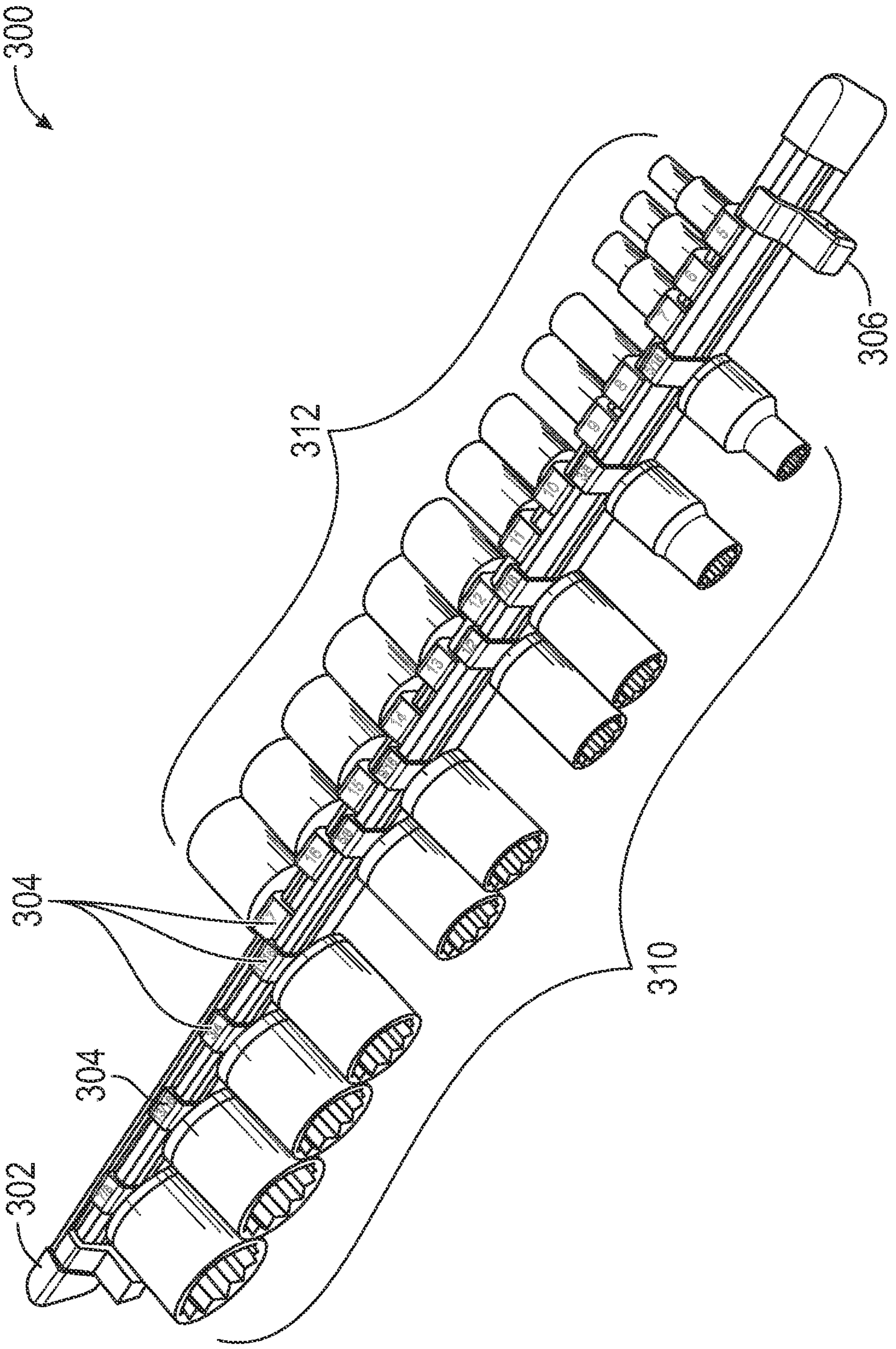
FIG. 7 shows a tool holder.

FIG. 7 shows a tool set 300 with a planar socket holder bar 302 having movable socket holder clips 304 slidably mounted to the bar and with square socket bosses 306 protruding toward one face or the other of the bar. All of the bosses for supporting inch sockets 310 extend to one side, and all those for supporting metric sockets 312 face the opposite side or direction. The clips are arranged in a sequence based on the actual dimension of the socket to be received. Each clip is marked with an indicia indicating the socket dimension to be received. Thus, the metric and inch clips are interspersed. In this embodiment, the clips are narrower than many of the sockets, and in some instances are economical with space by remaining adjacent on each side. In alternative embodiments in which the holder has only one side or face for retaining tool elements, all clips would be sequenced by size indicia (the actual dimension) so that the matching mounted sockets would be arranged by size.

In addition, because users may have existing tool sets of both formats, there may be a need for storage blocks or cases that simply arrange existing tools in a more convenient way. These storage facilities may include bench blocks designed to rest on a workbench, tool holders of the types illustrated above but without the tools included, and any other type of tool storage facility having a position or location sized, shaped, or arranged to accept a certain tool size.

Figure 8:
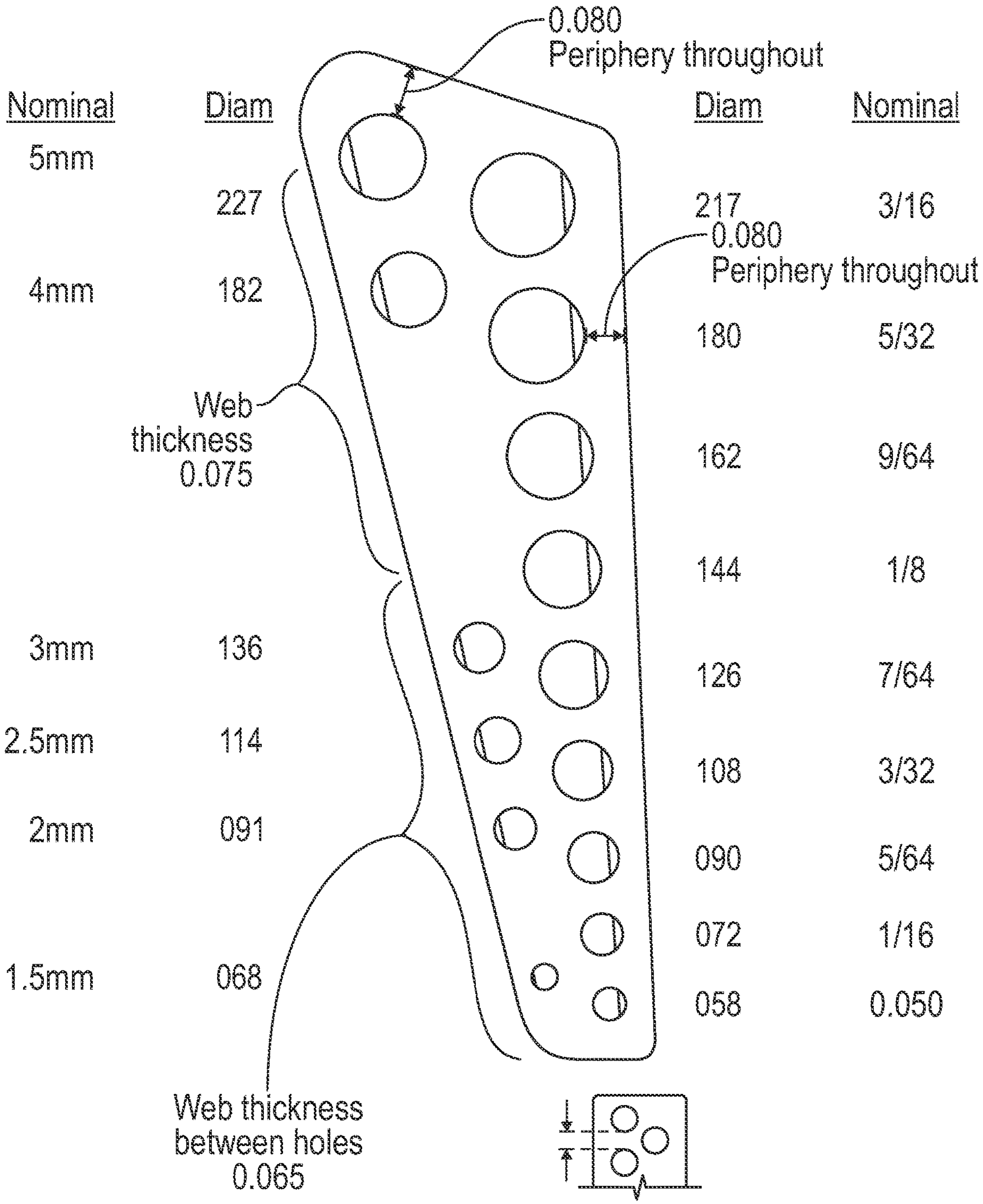
FIG. 8 shows a tool holder.
Figure 9:
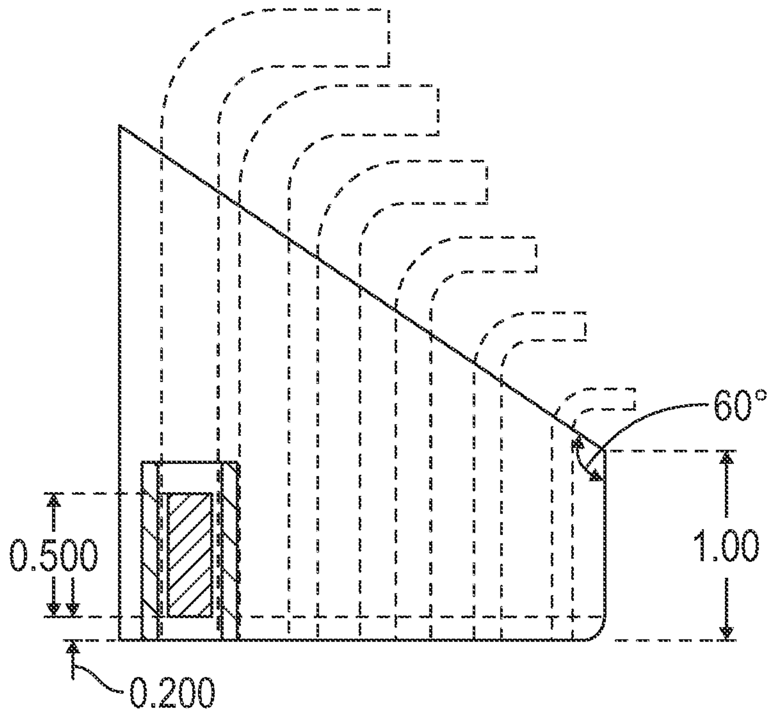
FIG. 9 shows a graph.
Figure 10:
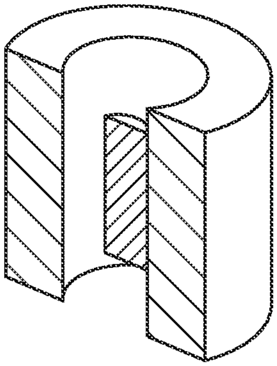
FIG. 10 is a sectional view of a tool holder.
Figure 11:
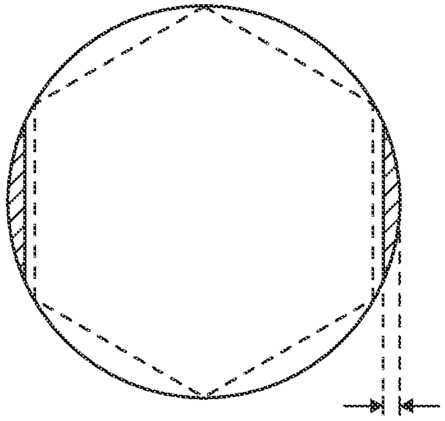
FIG. 11 shows a diagram.

FIG. 8 shows a top view of an Allen key holder tool related to that of FIG. 1, with the two formats laid out in rows, with the inch tools in a straight row, and the metric tools of intermediate size positioned in a second row. There are fewer of the metric tools, and each aperture is arranged in an equilateral triangle with equal wall webs separating the metric hole from each of the two adjacent inch holes as the spacing of the holes in each row. For the smaller sizes the web thickness is about 0.065 inch, and the web is about 0.075 for the larger holes and tools in this range up to 5 mm. FIGS. 9, 10, and 11 show a side view of the same tool holder, including a flat inside the hole for retaining the tool with the point edge of the tool against the flat.

Figure 12:
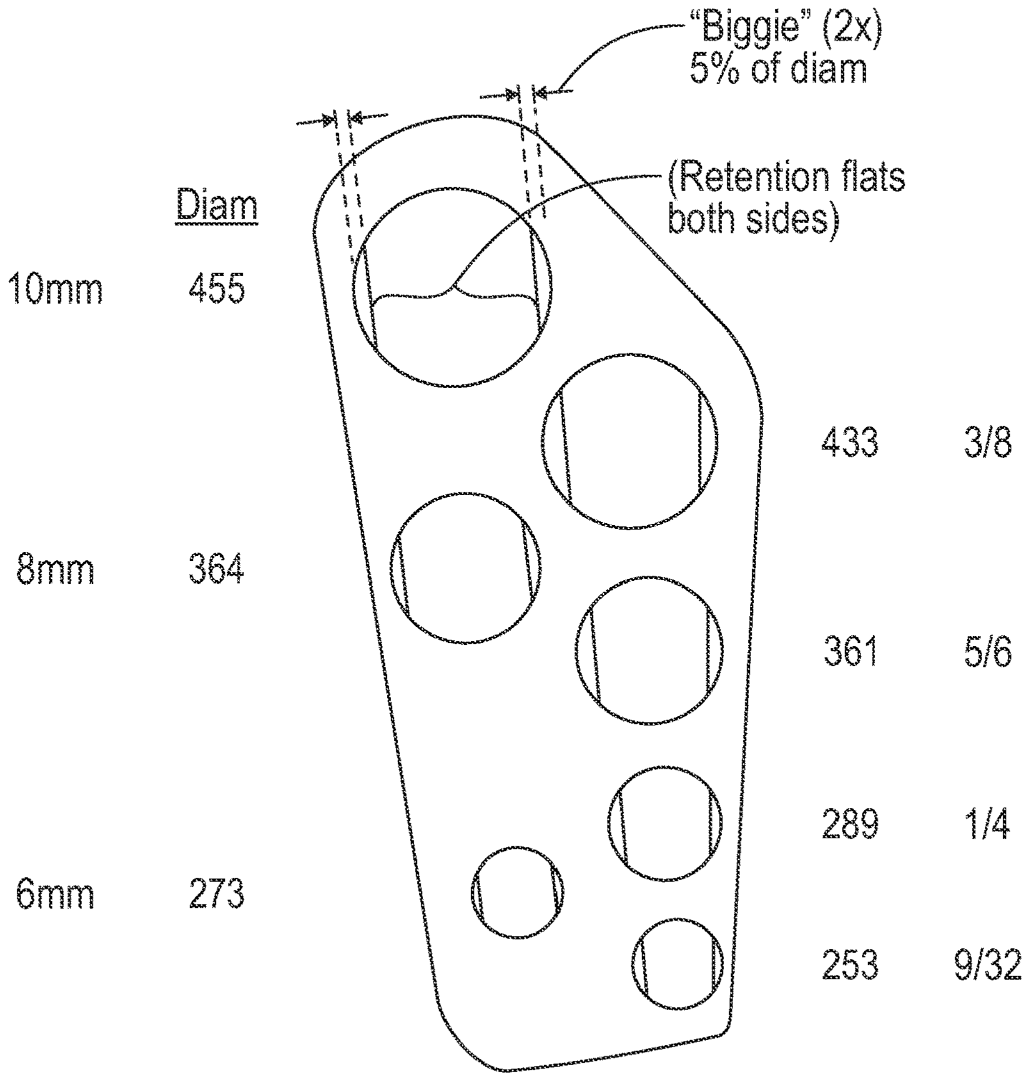
FIG. 12 shows a tool holder.
Figure 13:
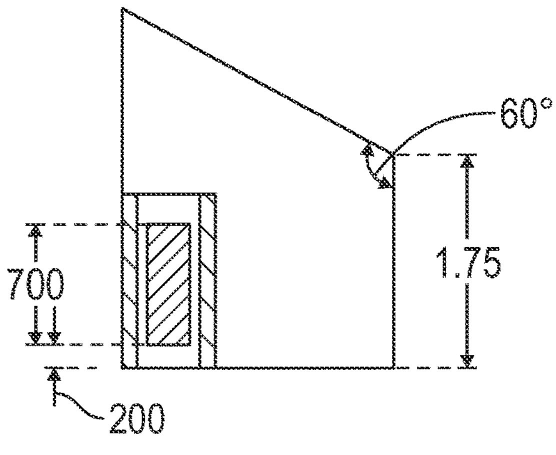
FIG. 13 shows a graph.

FIGS. 12 and 13 show a companion holder for the larger Allen tools of 7/32 to 10 mm size.

Figure 14:
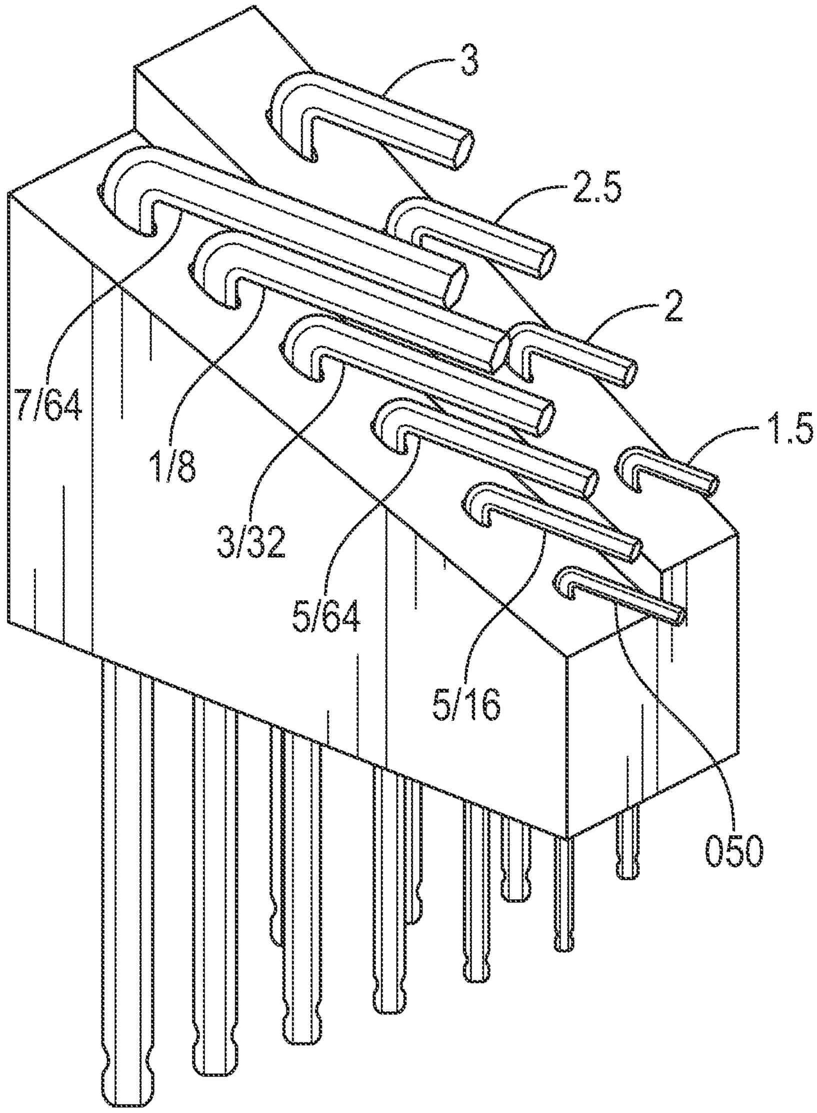
FIG. 14 shows a tool kit.

FIG. 14 shows a tool holder with the inch tools extending above a sloped upper surface in a row, and the metric tools extending above a higher sloped surface that is stepped above the inch tool slope for improved visibility.

Not shown is a version for Hex bits in which a conventional grid box with a compartment for each hex bit is populated with hex bits in size sequence without segregating inch bits from metric bits. These may be arranged sequentially in rows as one would read, or any other sequence by size. Printed or molded indicia may assist with replacement, and instead of box-like compartments, the receptacles may be sized to closely receive the dimensional working end of each bit to force the bits to be replaced in the correct spaces. This may be achieved by connecting a socket head screw of the right size into a base so that each bit resides in the type of screw it is sized to drive. More preferably, a molded plastic array of sockets replicates this effect. The preferred embodiment may be considered as a tool kit with a first set of tools of a first standard and of different sizes, a second set of tools of a different second standard and of different sizes, a holder adapted to receive the first and second set of tools intermixed with each other in an integrated sequence arranged according to size irrespective of standard.

I claim:

1. A tool set
comprising: a plurality of tool
elements;

a first subset of the tool elements being of a first measuring system standard;

a second subset of the tool elements being of a different second measuring system standard;

the tool elements each having an associated size and position; and the position of the tool elements of each subset being based solely on the associated size of each tool element, irrespective of standard.

2. The tool kit of claim 1 wherein the position of each tool element of each of the subsets is also based on the associated size of at least some of the tool elements of the other subset.

3. The tool kit of claim 1 wherein the tool elements are arranged sequentially by size.

4. The tool kit of claim 1 wherein each tool element is nearest the tool elements with the nearest associated sizes to its own associated size.

5. The tool kit of claim 1 wherein each tool element is in a first direction away from the tool element with the next greater associated size and in an opposite second direction from the tool element with the next smaller associated size.

6. A tool kit comprising:

a first set of tools of a first standard and of different sizes;

a second set of tools of a different second standard and of different sizes;

and a holder configured to receive the first and second set of tools arranged in a sequence with positioned based on tool size, irrespective of standard.

7. The tool kit of claim 6 wherein the first and second sets are socket sets.

8. The tool kit of claim 6 wherein the holder is a fiat elongated body having opposed sides, and wherein the holder is configured to retain tools of the first set on one side and tools of the other set on the other side.

9. The tool kit of claim 6 wherein the holder is an elongated body having first and second pivot axes at opposed respective first and second ends, and a first plurality of tools pivotally connected at the first end to pivot about the first axis ranging in size from a smallest size to a first intermediate size, and a second plurality of tools pivotally connected at the second end to pivot about the second axis ranging in size from a second intermediate size greater than the first intermediate size to a largest size.

10. The tool kit of claim 9 wherein the first plurality of tools is arranged by size, and wherein the second plurality of tools is arranged by size.

11. The tool kit of claim 6 wherein at least some of the retention locations are sequentially adjacent to at least one retention locations of a different measuring system standard.

12. The tool kit of claim 6 wherein at least some of the tool elements are sequentially adjacent to at least one tool element of a different measuring system standard.

13. The tool kit of claim 6 wherein at least some of the retention locations of a selected measuring system standard intervene between retention locations associated with a different measuring system standard.

14. The tool kit of claim 6 wherein at least some of the tools are adjacent to a tool of the same standard.

15. The tool kit of claim 6 wherein at least three of the tools are in a group adjacent to each other and of the same standard.

16. The tool kit of claim 6 wherein at least a selected one of the tools is between and adjacent to tools of the same standard as the selected one of the tools.

17. The tool kit of claim 6 wherein one of the standards is metric, and wherein each of the metric tools is adjacent only tools of the other standard.

18. The tool kit of claim 6 wherein the tools are arranged in a linear path.

19. The tool kit of claim 17 wherein the linear path has a plurality of linear segments beside each other.

20. The tool kit of claim 18 wherein the linear segments comprise at least a first segment configured to retain a first plurality of tools ranging in size from a smallest size to a first intermediate size, and a second segment configured to retain a second plurality of tools ranging in size from a second intermediate size greater than the first intermediate size to a largest size.

21. A tool set comprising: a plurality of tool elements;

a first subset of the tool elements being of a first measuring system standard;

a second subset of the tool elements being of a different second measuring system standard;

the tool elements each having an associated size; and the tool elements being arranged in a linear sequence based on size.

* * * * *